US006665700B1

(12) United States Patent
Sugisaki et al.

(10) Patent No.: US 6,665,700 B1
(45) Date of Patent: Dec. 16, 2003

(54) DISTRIBUTED-MEMORY MULTIPROCESSOR SYSTEM UTILIZING PLURAL MULTIPROCESSORS WITH VIRTUAL STORAGE SPACE

(75) Inventors: Yoshinori Sugisaki, Kawasaki (JP); Katsunori Takayama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 08/582,662

(22) Filed: Jan. 4, 1996

Related U.S. Application Data

(63) Continuation of application No. 08/186,863, filed on Jan. 27, 1994, now abandoned.

(30) Foreign Application Priority Data

Jan. 28, 1993 (JP) .............................................. 5-012331

(51) Int. Cl.[7] ................................................ G06F 9/00
(52) U.S. Cl. ...................................... 709/104; 712/38
(58) Field of Search ................................ 711/147, 148, 711/206, 151, 152; 712/38; 710/240, 241, 242; 709/109

(56) References Cited

U.S. PATENT DOCUMENTS

| 4,007,450 | A | * | 2/1977 | Haibt et al. ................. | 395/200 |
|---|---|---|---|---|---|
| 4,037,209 | A | * | 7/1977 | Nakajima et al. ........... | 364/200 |
| 4,539,637 | A | * | 9/1985 | DeBruler ..................... | 395/650 |
| 4,648,035 | A | * | 3/1987 | Fava et al. .................. | 364/200 |
| 4,811,216 | A | * | 3/1989 | Bishop et al. ............... | 364/200 |
| 4,928,224 | A | * | 5/1990 | Zulian ......................... | 395/325 |
| 4,965,717 | A | * | 10/1990 | Cutts, Jr. et al. ........... | 364/200 |
| 4,991,079 | A | * | 2/1991 | Dann .......................... | 395/200 |
| 5,117,350 | A | * | 5/1992 | Parrish et al. ............... | 395/425 |
| 5,123,101 | A | * | 6/1992 | Sindhu ........................ | 395/400 |
| 5,146,607 | A | * | 9/1992 | Sood et al. .................. | 395/800 |
| 5,175,837 | A | * | 12/1992 | Arnold et al. ............... | 711/152 |
| 5,214,775 | A | * | 5/1993 | Yabushita et al. .......... | 711/117 |
| 5,247,629 | A | * | 9/1993 | Casamatta et al. .......... | 395/400 |
| 5,249,297 | A | * | 9/1993 | Brockmann et al. ........ | 710/105 |
| 5,303,362 | A | * | 4/1994 | Butts, Jr. et al. ............ | 711/121 |

* cited by examiner

*Primary Examiner*—Larry D. Donaghue
(74) *Attorney, Agent, or Firm*—Arent Fox Kintner Plotkin & Kahn, PLLC

(57) ABSTRACT

In a distributed-memory multiprocessor system in which a plurality of processors have their respective memories, some of the processors are placed in redundant execution of writing into a virtual storage space. At redundant execution, each processor makes a determination of whether or not it is to perform the writing. As a consequence, only a single processor is allowed to write data into the virtual storage space, which solves the data transfer overhead problem. If a processor that has a memory with an area to be written into performs the writing, then the speed of processing will be further increased.

17 Claims, 15 Drawing Sheets

FORTRAN SOURCE PROGRAM

PROGRAM

① ! XOCL PROCESSOR P (4)

② DIMENSION G (20), L

③ ! XOCL GLOBAL G (/ (PROC=P, INDEX=1 : 20, PART=BAND)

④ ! XOCL LOCAL L

⑤ ! XOCL PARALLEL REGION

⑥ G (1) = L

⑦ ! XOCL END PARALLEL

DISTRIBUTED-MEMORY MULTIPROCESSOR SYSTEM UTILIZING PLURAL MULTIPROCESSORS WITH VIRTUAL STORAGE SPACE

This application is a continuation of application Ser. No. 08/186,863 filed Jan. 27, 1994, now abandoned.

BACKGROUND OF THE INVENTION

1. Field of the Invention

The present invention relates to a distributed-memory multiprocessor system in which memories are distributed over multiple processors, which ensures increased efficiency of writing into virtual global space at redundant execution.

2. Description of the Related Art

To increase the processing speed, computers are now in progress of multiprocessor version. As a memory system for such multiprocessor systems, a distributed memory system is adopted. In such a distributed memory system, data transfers occur frequently because of the division of data among processors. In particular, in distributing the processing of a huge or multi-dimensional array over processors in the field of scientific and engineering computations by, for example, FORTRAN programs, increasing the speed of data access has been desired.

In the parallel processing of a multiprocessor system, each processor may perform separate processing or the same processing redundant execution. Actually, it seems to be unnecessary that all processors perform the same process redundantly. In order to make only one processor among the processors perform the process, however, the parallel process should be stopped and switched to the process by one processor, thereby decreasing the performance efficiency of the system. Therefore, redundant execution is generally performed in a parallel process of a multiprocessor system. Speeding up such redundant execution, which is effective for all the processors, is also very effective in speeding up the overall processing.

FIG. 1 illustrates an example of a prior art. This figure shows a space structure of storage areas in a distributed-memory multiprocessor system.

Virtual global space 2 is a virtual storage space to which each processor is allowed in common to make access. Program 1 is executed by each processor. Local spaces 3-1 to 3-4 are accessed by processors P1 to P4, respectively.

When a distributed-memory multiprocessor system processes a huge quantity of data or a multi-dimensional array of data using a scientific and engineering computing program, such data will be distributed among processors. In this case, each processor may simultaneously perform the same processing such as data initialization. It is called redundant execution that each processor performs the same processing.

In the system shown in FIG. 1, the processors P1 to P4 carry out redundant execution of the program 1. Here, A is a global variable and b is a local variable. The program 1 instructs the processors P1 to P4 to write the value of the variable b which they have in their respective local spaces 3-1 to 3-4 into the variable A in the virtual global space 2.

In the conventional system shown in FIG. 1, all the processors P1 to P4 perform the writing into the same global variable A at redundant execution. However, the writing into the virtual global space 2 needs processor-to-processor data transfers when a processor has not a write area within its memory. Thus, with the writing into the virtual global space 2 at redundant execution, processor-to-processor data transfers occur frequently, reducing the processing speed.

A drawback with the conventional system is that, since all the processors perform the same processing at redundant execution, each processor performs the writing into the global variable A simultaneously and thus communications overhead increases. This results in reduced processing efficiency at redundant execution.

SUMMARY OF THE INVENTION

It is therefore an object of the present invention to provide a multiprocessor system which permits the speed of writing into virtual global space at redundant execution to be increased.

The present invention is directed to a distributed-memory multiprocessor system in which multiple processors each having a respective individual memory are integrated with one another by a communications network so that fast redundant execution of parallel processing is permitted. A memory area of each processor is divided into a private area to which only that processor is allowed to make access and a shared area to which other processors as well as that processor are allowed to make access. The private area corresponds to local space inherent in an individual processor. The shared area forms a virtual global space together with the shared areas associated with the other processors, to which each processor is allowed in common to make access. A range of the virtual global space can be set up arbitrarily. That is, it can also be set up on the memories of processors other than processors adapted for parallel processing.

A central processing unit (CPU) in each processor calls, for example, a write processing library from the memory and executes it redundantly, serving as a right-of-write determination processing section and a write processing section. The right-of-write determination processing section includes a representative determination processing section and a variable location determination processing section.

When writing into a variable within the virtual global space at the stage of redundant execution processing in which some of multiple processors perform the same processing in parallel, the representative determination processing section of each processor makes a determination of whether or not that processor is a representative of the processors in redundant execution. The representative determination processing section informs the writing processing section of a result of that determination.

When writing into a variable within the virtual global space at redundant execution, the variable location determination processing section of each processor makes a determination of whether or not that variable is present in a memory area of processors in redundant execution. When the variable is present in one of the memory areas of the processors, the variable location determination processing section makes a further determination of whether or not that variable is present in the memory area of that processor having the variable location determination processing section. The variable location determination processing section informs the write processing section of results of the determinations.

The write processing section of each processor is responsive to a determination result of the representative determination processing section to actually write into the variable within the virtual global space when that processor is the representative. Otherwise, it does not perform the writing into the variable. Thus, data transfer is made to the memory area to be written into from only the representative processor. As a result, access competition to the communications network among the processors is avoided, thus increasing the speed of the redundant execution processing. When the variable to be written into is present in the memory of the representative processor, it is necessary only that data copy be made within that processor. That is, in this case, data transfers over the communications network is not needed.

In addition, the writing processing section of each processor is responsive to a determination result of the variable of location determination processing section to actually write into the variable, when the variable to be written into is present in the memory area of that processor. Otherwise, it does not perform the writing into the variable. When the variable to be written into is present in the memories of the processors in redundant execution, therefore, processor-to-processor data transfers become unnecessary, which further increases the speed of the redundant execution processing. When, on the other hand, the variable is present in a memory of a processor other than the processors in redundant execution, the representative processor simply makes data transfers.

According to the distributed-memory multiprocessor system of the present invention, processor-to-processor data transfers can be decreased, which would require an appreciable amount of execution time in redundant execution processing. Thus, a substantial reduction in execution time is permitted. In particular, processor-to-processor data transfers need not be made when the destination of data is among processors in redundant execution. Further, communications overhead for processor-to-processor data transfers is prevented, thus improving the processing performance of the system.

BRIEF DESCRIPTION OF THE DRAWINGS

One skilled in the art can easily understand additional features and objects of this invention from the description of the preferred embodiments and some of the attached drawings. In the drawings:

FIG. 5 shows an example of a source program for redundant execution;

FIG. 11 shows an example of a source program for substitution processing for a four-dimensional array;

DESCRIPTION OF THE PREFERRED EMBODIMENTS

Figure 1:
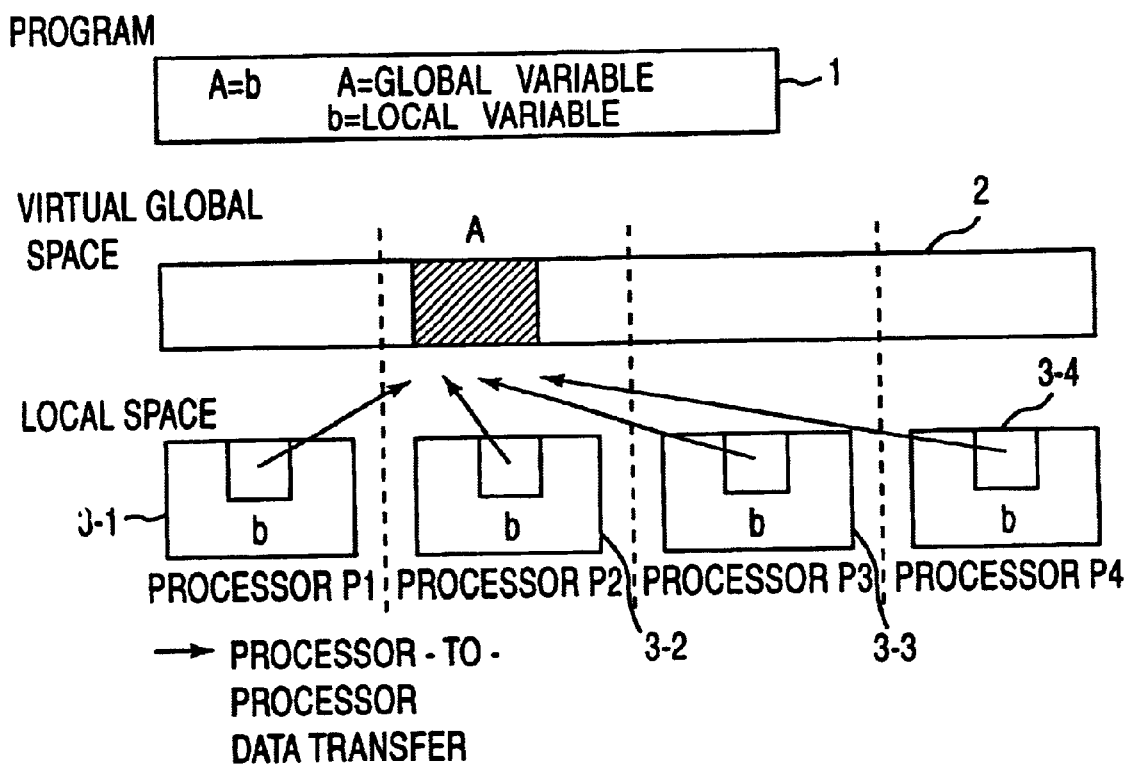
FIG. 1 shows data transfers at redundant execution.
Figure 2:
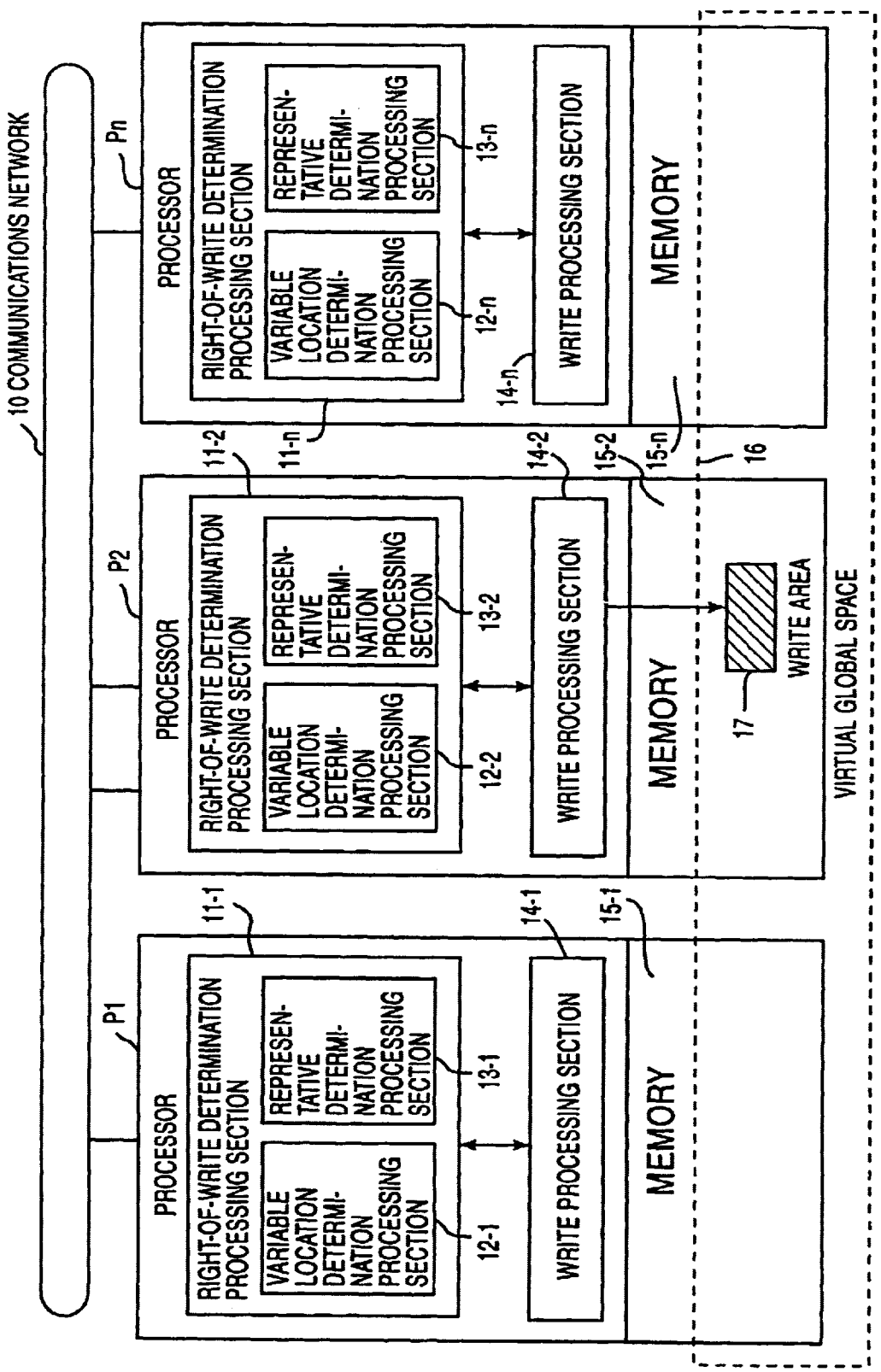
FIG. 2 shows a system configuration of the present invention.

Referring now to FIG. 2 there is shown a distributed-memory multiprocessor system according to an embodiment of the present invention.

As shown in FIG. 2, processors P1 to Pn are respectively equipped with memories 15-1 to 15-n and CPUs (central processing units) which, though not shown as such, implement right-of-write determination processing sections 11-1 to 11-n and write processing sections 14-1 to 14-n within themselves. The right-of-write determination processing sections 11-1 to 11-n include variable location determination processing section 12-1 to 12-n and representative determination processing sections 13-1 to 13-n, respectively. Portions of the respective memories 15-1 to 15-n form virtual global space 16. Write area 17 is a write area in the virtual global space 16.

A communications network 10 is used for processor-to-processor communications.

The system shown in FIG. 2 is a distributed-memory multiprocessor system in which multiple processors P1 to Pn are interconnected by the communications network 10 and the memories 15-1 to 15-n are distributed over the processors P1 to Pn. The virtual global space 16 is virtual storage space, to which each processor is allowed to make access, which is distributed among the memories 15-1 to 15-n of the processors P1 to Pn. In FIG. 2, one of the processors has been designated in advance as a representative and a flag "1", for example, is stored in the memory of the representative processor. A flag "0" is stored in the memory in each of other processors which are not designated as a representative.

The representative determination processing sections 13-1 to 13-n in the right-of-write determination processing sections 11-1 to 11-n of processors P1 to Pn determines whether or not a corresponding processor having the respective determination processing section is the representative for redundant execution when several processors, including the corresponding processor, write into the virtual global space 16 at a stage of redundant execution in which the processors perform the same processing. The representative determination processing section checks a value of the flag stored in the memory of the corresponding processor and determines whether or not the processor is the representative.

If it is turned out from a determination result of the representative determination processing section that the corresponding processor is the representative, then the write processing sections 14-1 to 14-n actually performs a process of writing into the write area 17 in the virtual global space 16. If the corresponding processor is not the representative, the write processing sections 14-1 to 14-n does not perform any writing process into the write area 17.

The variable location determination processing sections 12-1 and 12-n in processors P1 to Pn determine whether or not a variable into which a datum is written is present in the memories in several processors which are in redundant execution and whether or not that variable is present in the memory in a corresponding processor having the variable location determination processing section when the processors write into the virtual global space 16 at a stage of redundant execution in which the processors perform the same processing.

If it is turned out from a determination result of the variable location determination processing section that the write area 17 is present in the memory in the corresponding processor, the write processing sections 14-1 to 14-n actually performs the process of writing into the write area 17. If, on the other hand, the write area 17 is not present in its memory, the writing process is not performed.

According to the present invention, the variable location determination processing sections 12-1 to 12-n or the representative determination processing sections 13-1 to 13-n in the right-of-write determination processing sections 11-1 to 11-n in processors P1 to Pn determines whether or not a corresponding processor having the right-of-write determination processing section is allowed to actually perform a process of writing into the virtual global space 16 at redundant execution. As a result, only one processor is allowed to perform the writing process. Thus, the number of times of processor-to-processor data transfers, which, in the prior art, are made by all of redundant execution processors, is reduced to one at maximum.

If, for example, the write area 17 in the virtual global space 16 at redundant execution is present in the memory 15-2 of the processor P2, then only the processor P2 is allowed, as the representative, to perform the writing process. Consequently, the need for processor-to-processor transfers over the communications network 10 is eliminated, causing the execution time to be further reduced.

In the following embodiments, descriptions are made on the assumption that four processors P1 to P4 perform a redundant execution. Of course, the present invention is applicable to a different number of processors.

Figure 3:
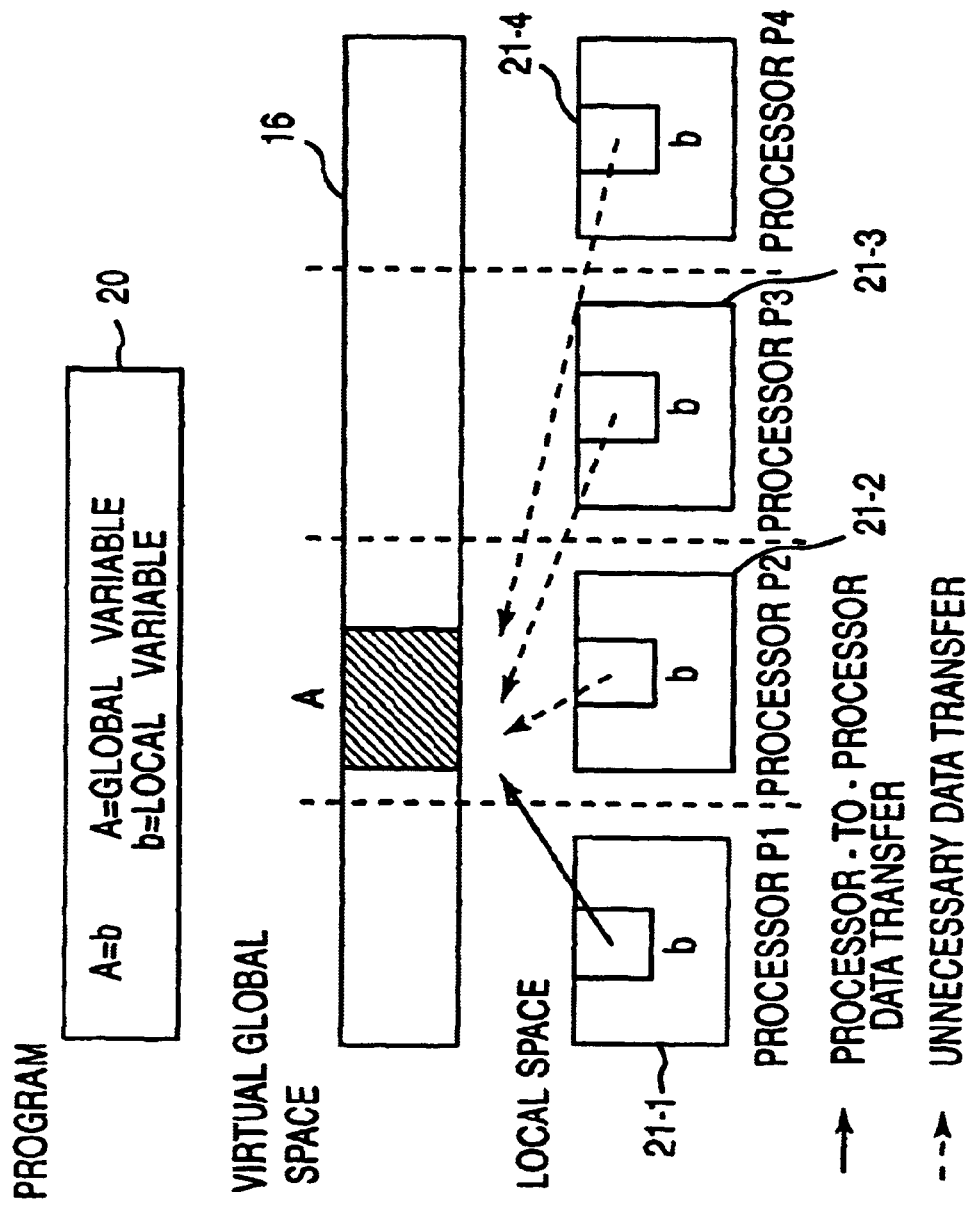
FIG. 3 shows a first embodiment of the present invention.

FIG. 3 is a diagram illustrating a first embodiment of the present invention.

In this embodiment, each processor executes a program 20 and makes access to a respective one of local spaces 21-1 to 21-4. The local spaces 21-1 to 21-4 are placed in the memories 15-1 to 15-4, respectively.

The program 20 is run on the processors P1 to P4 for redundant execution. Here, A denotes a global variable, and b denotes a local variable. The area of the global variable A is allocated to the virtual global space 16. The virtual global space 16 is generally divided among the memories 15-1 to 15-4 of the processors P1 to P4. The virtual global space 16 may be set up in the memories of other processors as well as in the memories of the processors P1 to P4 adapted for redundant execution.

The program 20 specifies that the value of the variable b that the processors P1 to P4 have in their respective local spaces 21-1 to 21-4 should be written into the variable A in the virtual global space 16. The value of the local variable b is the same in all of the local spaces 21-1 to 21-4 because of redundant execution.

In this case, each processor performs the following processes. Suppose here that the master processor, of the redundant execution processors, which makes data transfers as the representative is the processor P1. The master processor is selected to perform the main processing for control of execution of the program 20.

Each processor makes a determination of whether it is the master processor or not. When it is the master processor, that processor transfers the value of the variable b to a processor which has a memory in which the area of the global variable A is actually set up, for example, the processor P2, and then writes it into the virtual global space 16. When it is not the master processor, on the other hand, that processor terminates the processing without performing anything for the writing process. Accordingly, at redundant execution as well, mere data transfer from the processor P1 to the processor P2 is made as shown in FIG. 3. That is, data transfers from other processors are not needed.

Figure 4:
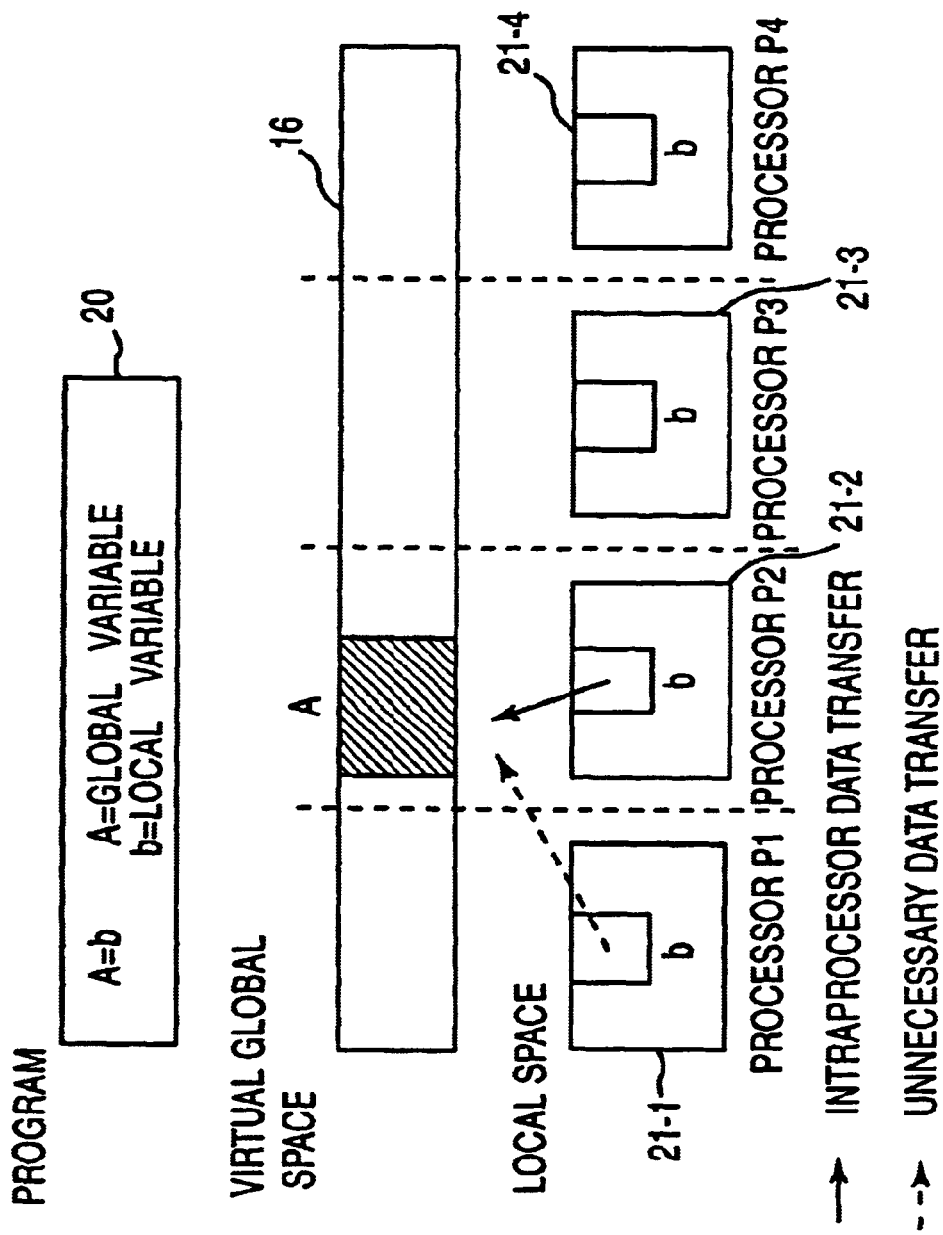
FIG. 4 shows a second embodiment of the present invention.

FIG. 4 is a diagram illustrating a second embodiment of the present invention.

As in the embodiment shown in FIG. 3, the program 20 is run on the processors P1 to P4 for redundant execution. Here, A denotes a global variable, and b denotes a local variable. The area of the global variable A is allocated to the virtual global space 16. Here, the area of the global variable A is set up within the memory of the processor P2.

In the first embodiment, a processor that performs in the writing process as the representative at redundant execution is made the master processor. Since the processors P1 to P4 have the same value b, however, any one of the processors P1 to P4 may perform the writing process instead of the master processor. In the second embodiment, therefore, the representative processor that performs the writing process is made the processor P2 in which the global variable A is present.

In this case, data transfer is simply made within the same processor P2, which makes unnecessary processor-to-processor data transfer over the communications network 10 shown in FIG. 2. If, on the other hand, the global variable into which a value is written is not present in the processors in redundant execution, then any processor, for example, the master processor P1, will perform the writing process through use of processor-to-processor data transfers.

FIG. 5 shows an example of a user program for redundant execution. In the FORTRAN source program 40 shown in FIG. 5, the statement "!XCOL" is a control statement for parallel execution. Here, the statement ① specifies the number of processors for redundant execution to be four. The statement ② defines G(20) and L as array data. The statement declares a global variable G, and the statement ④ declares a local variable L. The statement ⑤ specifies the start of the parallel processing by the four processors. The following statement ⑥, which is common to the processors, is a statement for redundant execution. The statement ⑦ specifies the end of the parallel processing.

In this example, the data area and the number of processors are specified by the statement ③, which sets information for division as follows:

processors for division=P (P is declared by statement ① to be four);

range for division=1:20 (G(1) to G(20)); and division type=uniform division.

Figure 6:
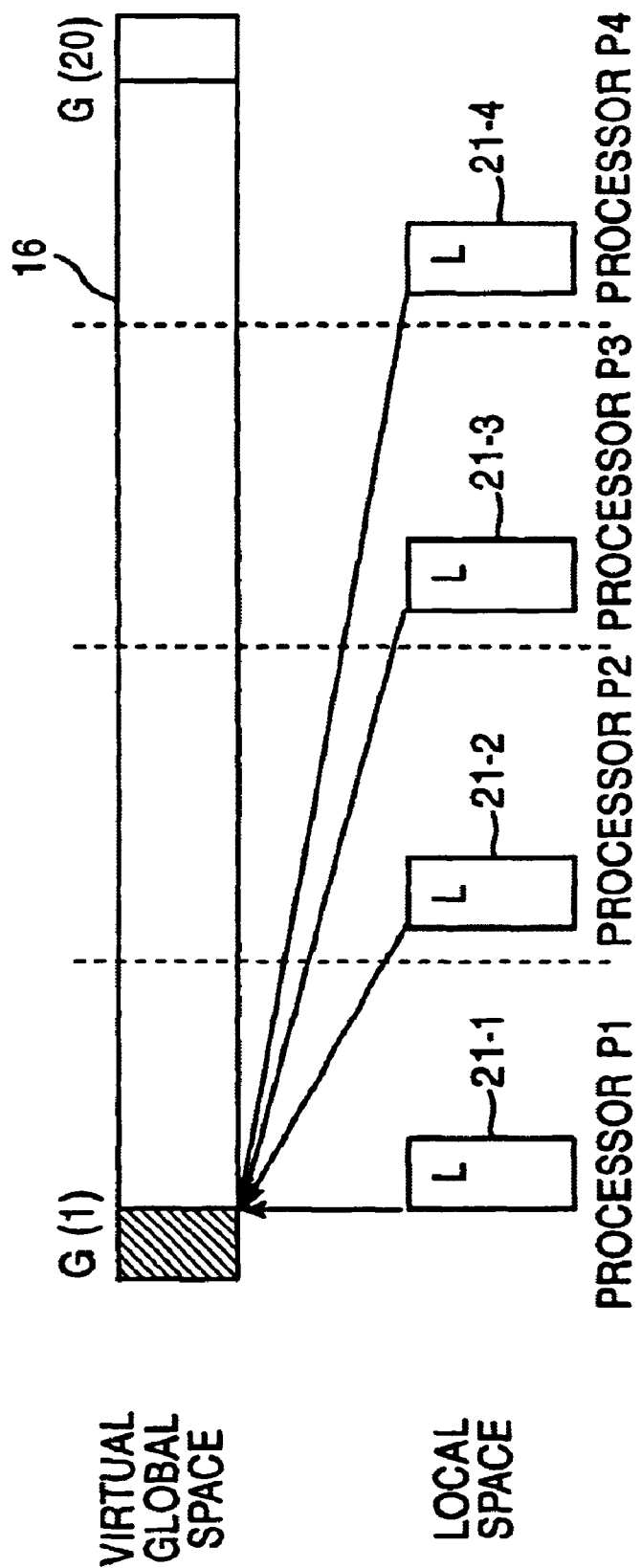
FIG. 6 shows data transfers from local spaces to a virtual global space.

The four processors P1 to P4, the virtual global space 16, and the local spaces are related as shown in FIG. 6.

The statement ⑥ "G(1)=L" specifies data transfer from the local variable L in each processor to the global variable G(1). It is only the processor P1 that performs the transfer processing actually.

Figure 7:
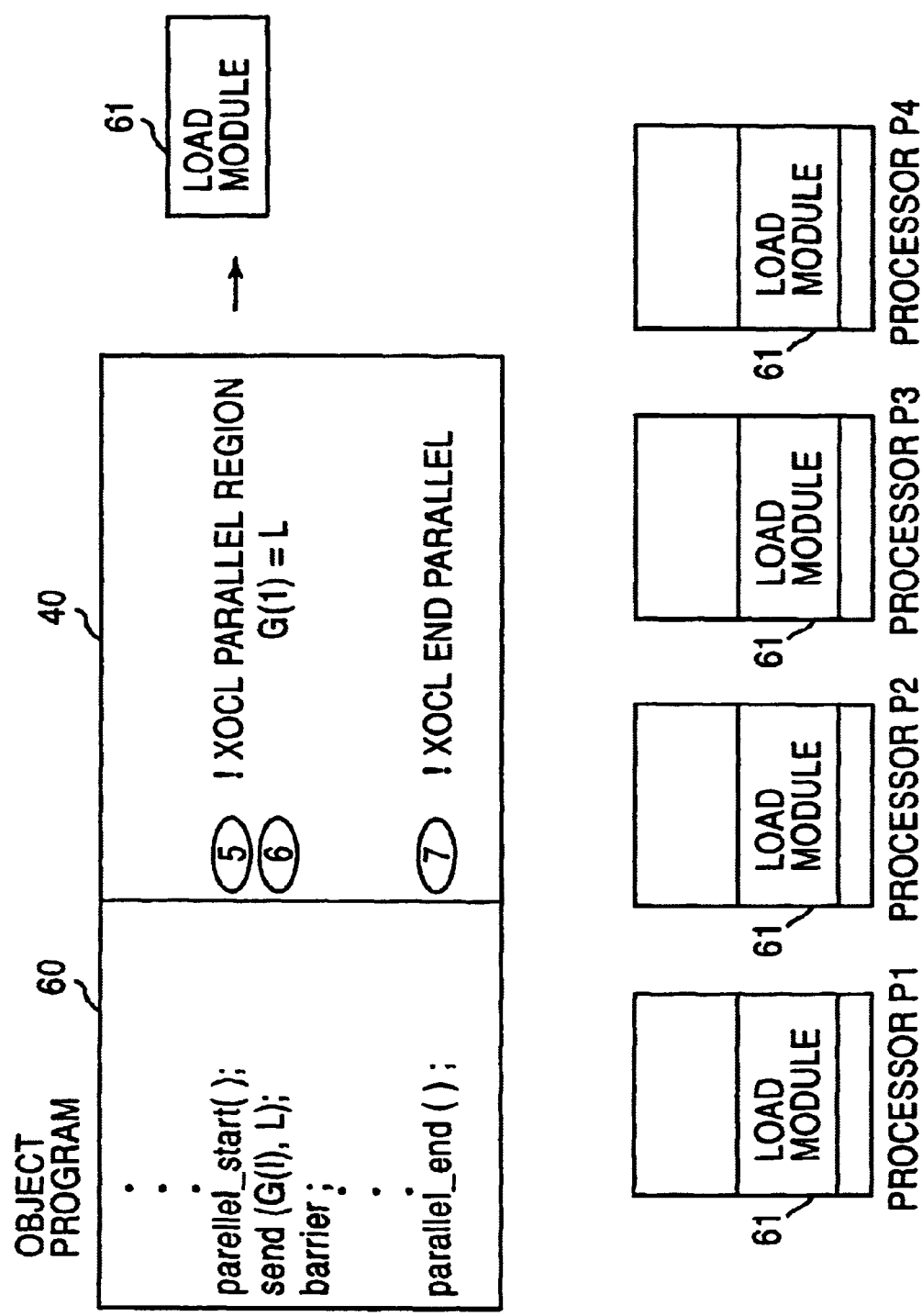
FIG. 7 shows an object program that a compiler outputs.

The FORTRAN source program 40 shown in FIG. 5 is expanded by a compiler to such an object program 60 as shown in FIG. 7. To facilitate the understanding of the description, the object program 60 is here represented in pseudo-code form.

The statement ⑤ in the source program 40 shown in FIG. 5 is expanded to "parallel start( );". A function represented by this pseudo code, which calls a library for initializing four processors in parallel, indicates a redundant execution. The following statement ⑥ "G(1)=L" is expanded to "send (G(1), L);" and "barrier;". The former function (hereinafter referred to as SEND function) specifies data transfer from the local variable L to the global variable G(1). The latter specifies synchronization among the processors at redundant execution.

The statement ⑦ is expanded to "parallel_end( );". This function calls a library for ending the parallel processing by the four processors.

A load module 61 is created from the object program 60 expanded as shown in FIG. 7 and then allocated to each of the processors P1 to P4 for execution. That is, the load module 61 is set up on each of the processors P1 to P4 and executed independently.

Figure 8:
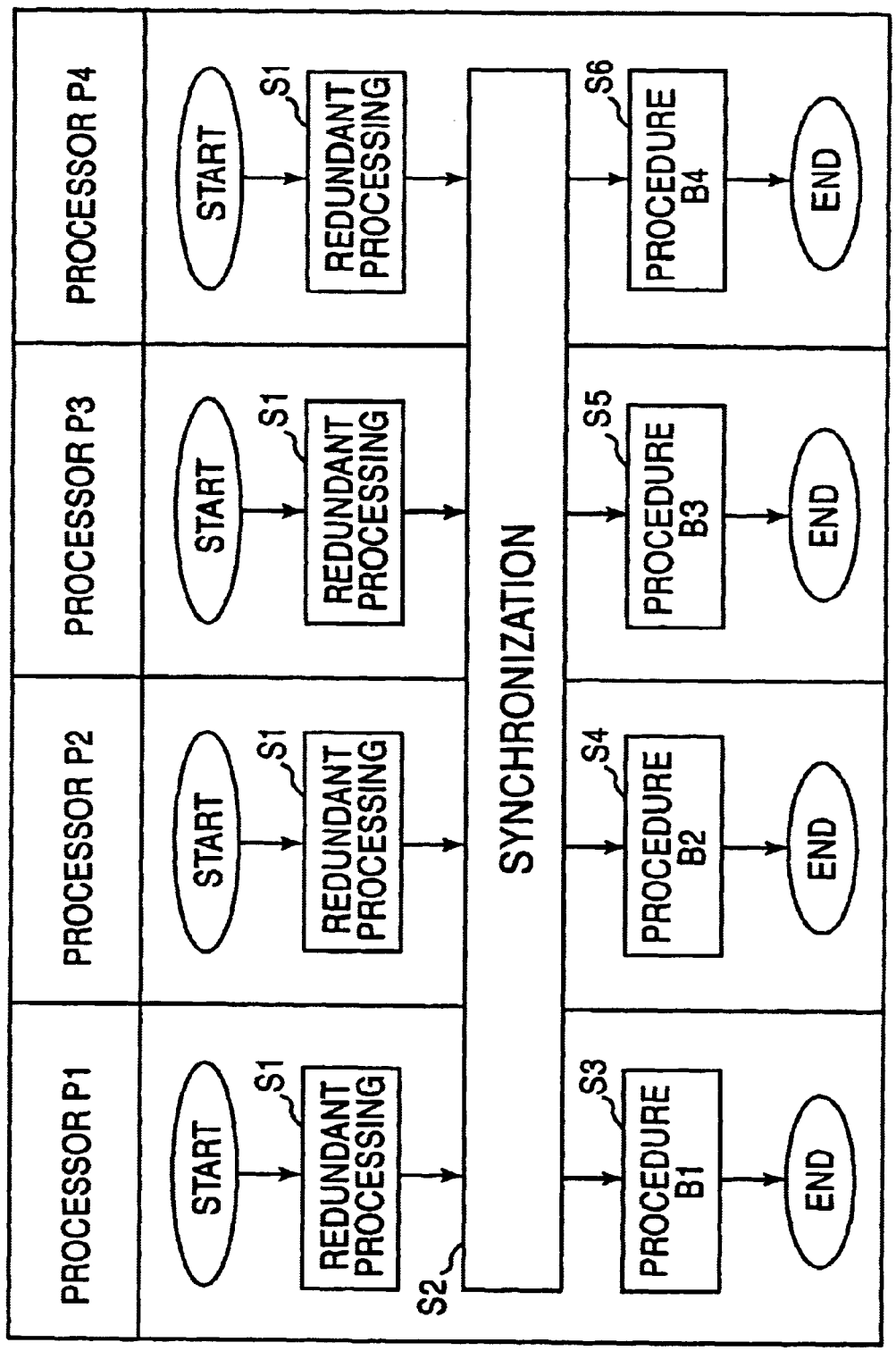
FIG. 8 is a flowchart for parallel processing by multiple processors.

FIG. 8 is a flowchart for the parallel processing of processors in embodiments of the present invention.

When the parallel processing of the processors P1 to P4 is started under instructions of the program, if it is redundant processing involving redundant execution, then each processor performs the redundant processing in step S1. At this step, in the first embodiment, only the master processor performs the writing of data, while, in the second embodiment, a processor that has a global variable to be written into within its memory performs the writing.

At the termination of the writing of data the processor performs the synchronization processing associated with the redundant execution in step S2. The other processors which have not performed the writing in step S1 immediately perform the synchronization processing in step S2. The synchronization processing in step S2, which is specified by "barrier" in the object program 60, is performed so as to coordinate the redundant processing in step S1 and subsequent other processing.

To speed up processing, the synchronization processing is performed by the use of a termination-notifying signal line exclusively provided for each processor. When not performing the writing of data in step S1, each processor outputs a termination signal immediately onto its exclusive signal line. A processor which has performed the writing of data outputs a termination signal onto its exclusive signal line at the termination of the writing. When all the processors output termination signals, the synchronization processing in step S2 terminates. The synchronization processing by using the dedicated hardware in this manner eliminates the need for processor-to-processor transfers of termination signals over the communications network 10, causing the speed of processing to be increased.

Of course, the synchronization processing may be performed by transferring a termination signal from a processor which have performed the writing process to other processors over the communications network 10.

At the termination of the synchronization processing, the processors P1, P2, P3, and P4 advance to steps S1, S2, S3, and S4, respectively, thereby executing subsequent procedures B1, B2, B3, and B4. These procedures are not redundant processing and are independently executed in parallel.

Hereinafter, reference will be made to FIGS. 9 and 10 to describe the redundant processing of a library for performing the process of writing into the global variable. This library is called by the SEND function of FIG. 7 into execution by the CPU and has functions of the right-of-write determination processing section and the write processing section of FIG. 2.

Figure 9:
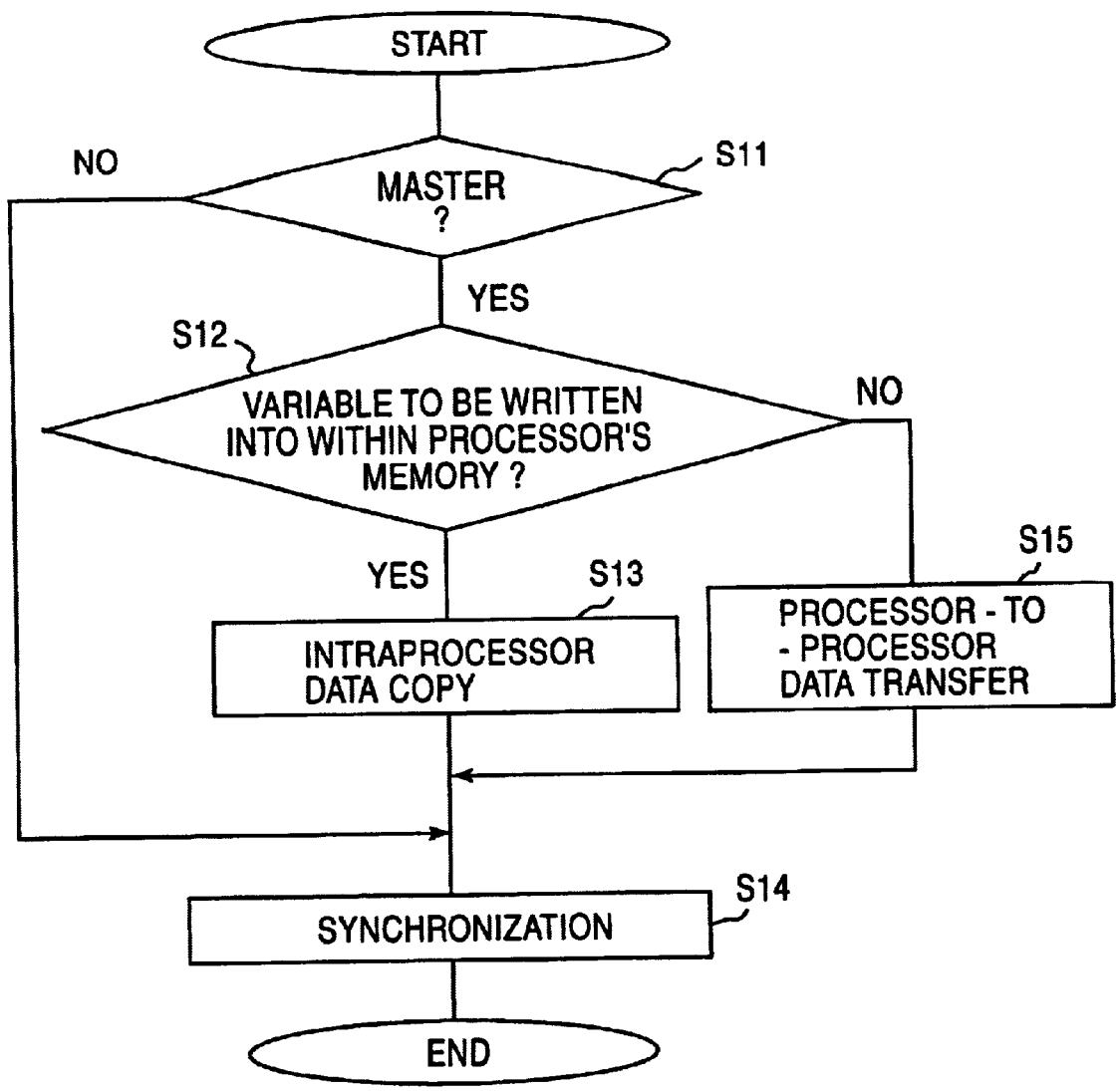
FIG. 9 is a flowchart for redundant processing of the first embodiment of the present invention.

FIG. 9 is a flowchart illustrating the redundant processing and the synchronization processing in the first embodiment.

When the redundant processing of the library is started, a determination is first made in step S11 as to whether a processor that is executing the library is the master processor or not. When it is not the master processor, without performing the writing process, it performs the synchronization processing in step S14. The synchronization processing in step S14 is the same as that in step S2 of FIG. 8.

When it is the master processor, a determination is made in step S12 as to whether or not the global variable to be written into is present within its memory. When the variable is not present in its memory, the master processor performs the process of writing into the memory area of some other processor that has the global variable through processor-to-processor data transfer over the communications network 10 in step S15 and then performs the synchronization processing in step S14.

When the variable is present in its memory, the master processor copies data from its local space in the processor to a corresponding memory area of the virtual global space 16 in step S13 and then performs the synchronization processing in step S14.

In the processing of FIG. 9, among the processors which performs the redundant processing, only the master processor writes data into the global variable and the other processors do not have to write data.

Figure 10:
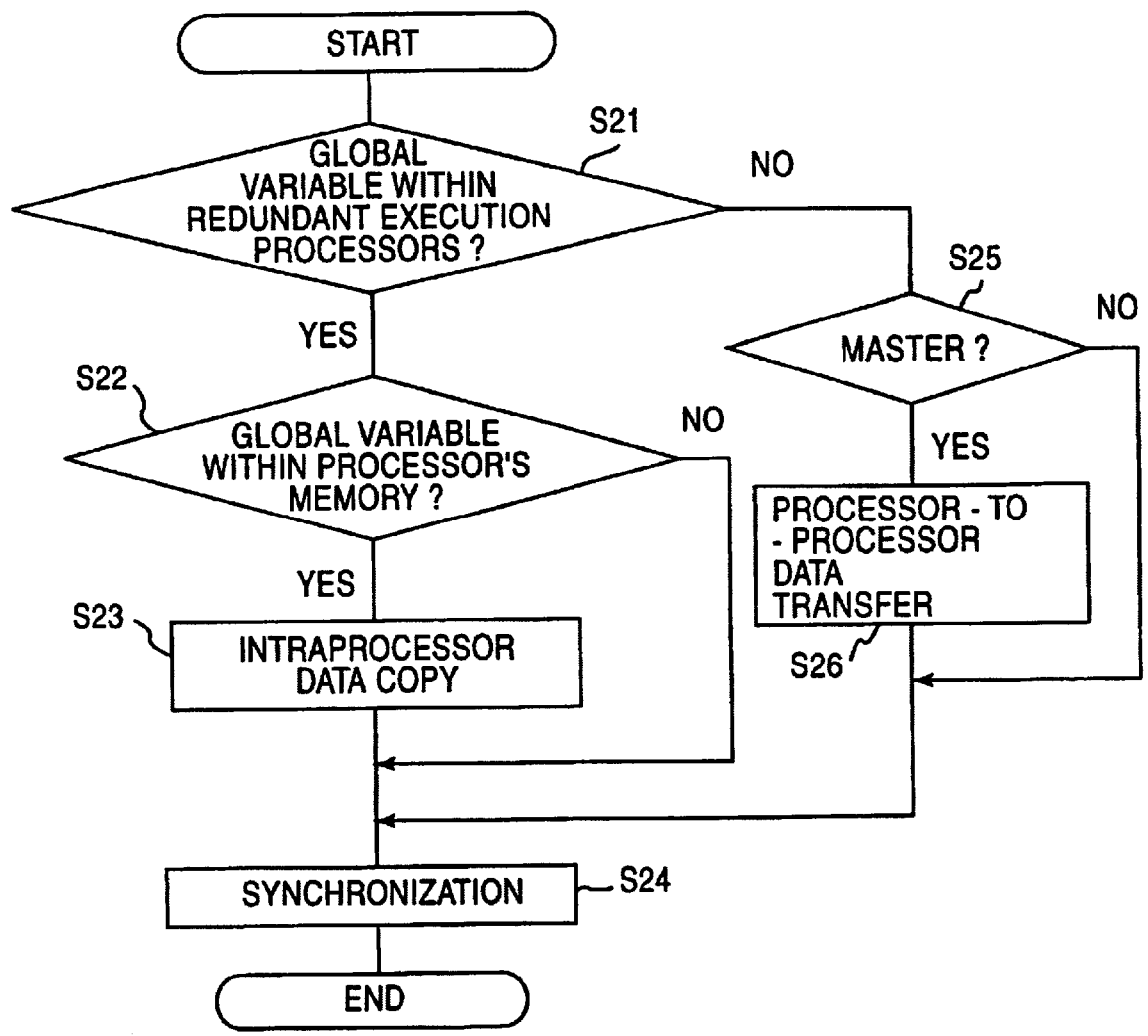
FIG. 10 is a flowchart for redundant processing of the second embodiment of the present invention.

FIG. 10 is a flowchart for the redundant processing and the synchronization processing of the second embodiment.

First, in step S21, a processor makes a determination as to whether or not a global variable to be written into is present in a group of processors which are in redundant execution. If it is not, the process advances to step S25. If it is, the processor makes a determination in step S22 as to whether or not the global variable is present within its memory. If it is not, then the same synchronization processing as in FIG. 8 is performed in step S24. If it is in step S22, then data is copied from its local space into a corresponding memory area of the virtual global space 16 in step S23 and then the synchronization processing is performed in step S24.

If, in step S21, the global variable is not present in the group of processors, then the processor makes a determination in step S25 as to whether or not it is the master processor. If it is not the master processor, then it performs the synchronization processing in step S24. If, on the other hand, it is the master processor, then the process advances to step S26 in which it performs a process of writing into a memory area of some other processor having the global variable through processor-to-processor data transfers. The processing of FIG. 10 minimizes the number of times of the processor-to-processor data transfers.

The first and second embodiments are described taking the case where a global variable fits within a memory of a single processor by way of example. It is also possible to increase the speed of processing in the case where a global variable span a plurality of processors in the same manner.

Figure 11:
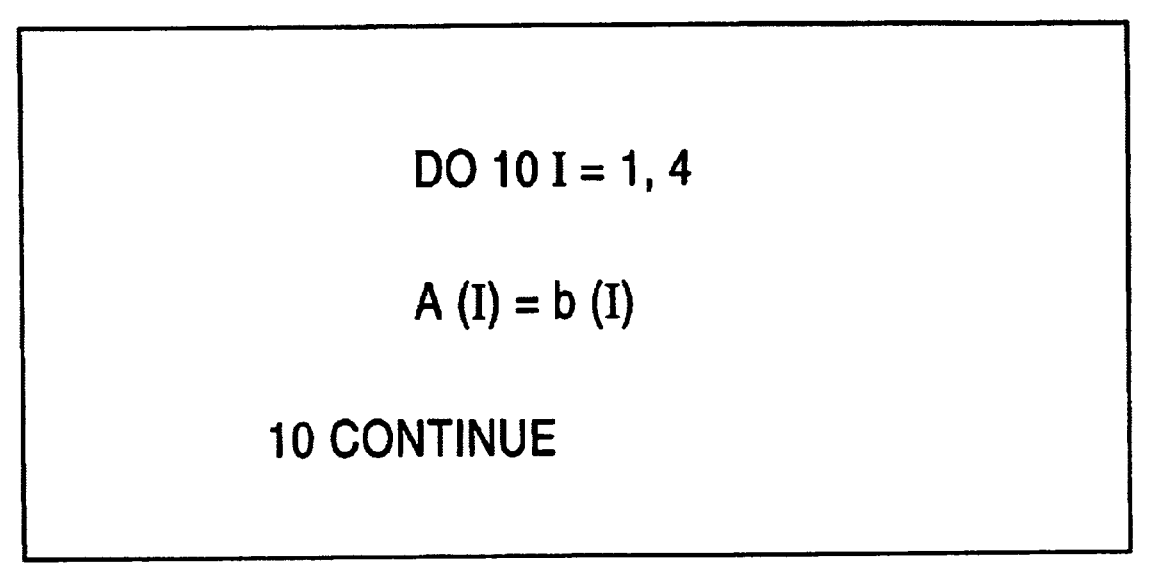

FIG. 11 shows an example of a FORTRAN source program adapted to write data into a global variable stored to span a plurality of processors through redundant execution.

In FIG. 11, an array A(I) (I=1, 2, 3, 4) is a global variable stored in memory areas within the virtual global space 16, and an array b(I) (I=1, 2, 3, 4) is a local variable stored in memory areas within the local spaces of the respective individual processors. The program of FIG. 11 specifies sequential substitution of the local variable b(I) for the corresponding global variable A(I).

All the global variables A(1), A(2), A(3), A(4) are not always stored in a memory of a single processor. Thus, the processing efficiency at redundant execution depends on which processors perform writing processes corresponding to I=1, 2, 3, 4 in FIG. 11.

Figure 12:
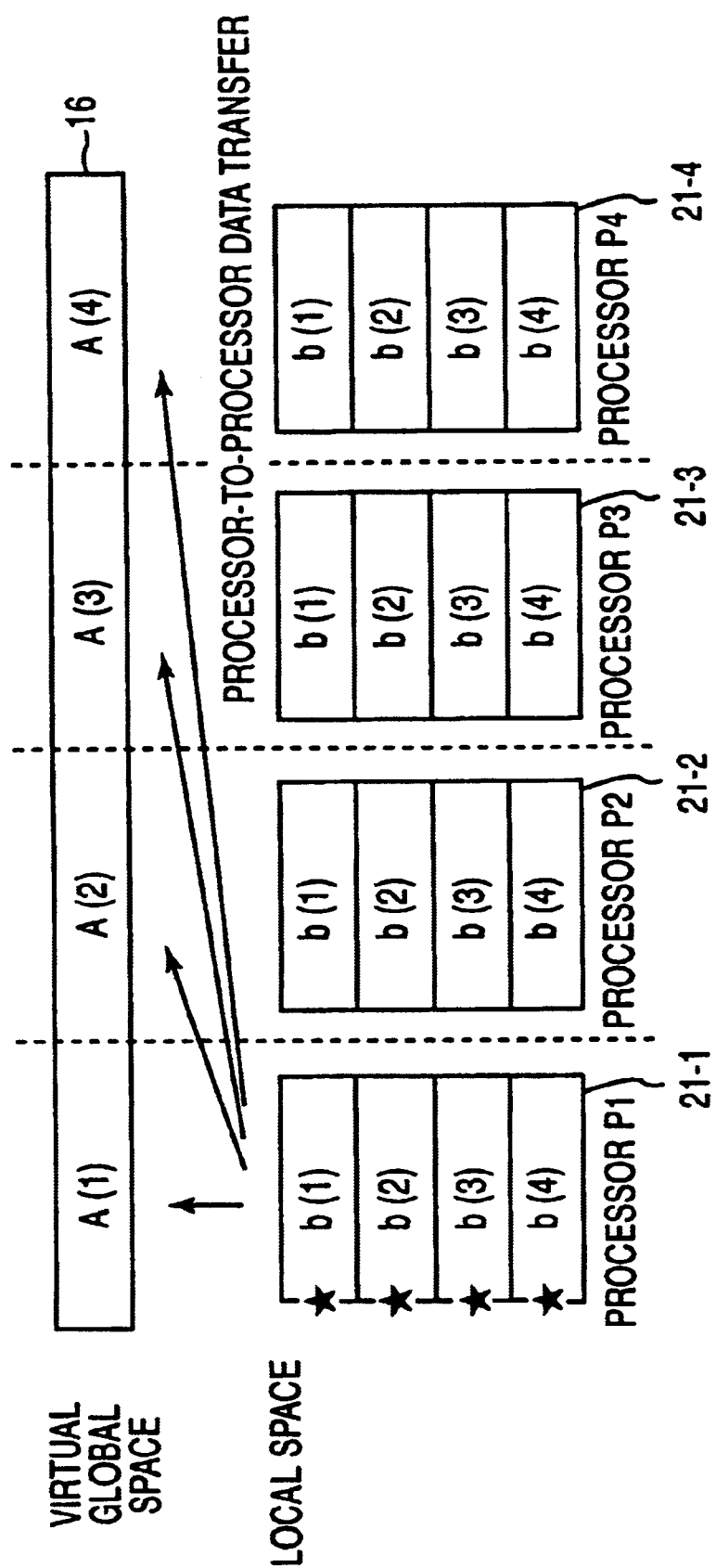
FIG. 12 shows a third embodiment of the present invention.

FIG. 12 is a diagram illustrating a third embodiment of the present invention, in which the writing processes specified by the program of FIG. 11 are performed by a master processor.

In FIG. 12, the global variables A(1), A(2), A(3), A(4) are stored distributed over those memory areas of the processors P1, P2, P3, and P4 which correspond to the virtual global space 16. The local variables b(1), b(2), b(3), b(4) are stored in the memory areas corresponding to the local spaces 21-1 to 21-4 of the respective processors P1 to P4. The value of b(I) stored in the memory of the processor P1 is equal to the value of b(I) stored in the memories of the three other processors.

When a load module of the program of FIG. 11 is executed in parallel by the processors P1 to P4, each processor makes a determination of whether or not it is the master processor. If it is the master processor, then it performs the writing processing. In the case of FIG. 12, the processor P1 is the master processor. Thus, the processor P1 performs all of the writing processes through intraprocessor data copy or processor-to-processor data transfers. In these processes, the values of the local variables b(1), b(2), b(3), b(4) with asterisks in the local space 21-1 are written into the global variables A(1), A(2), A(3), A(4), respectively.

The processors P2, P3, P4 are not the master processors and thus do not perform any writing process.

Figure 13:
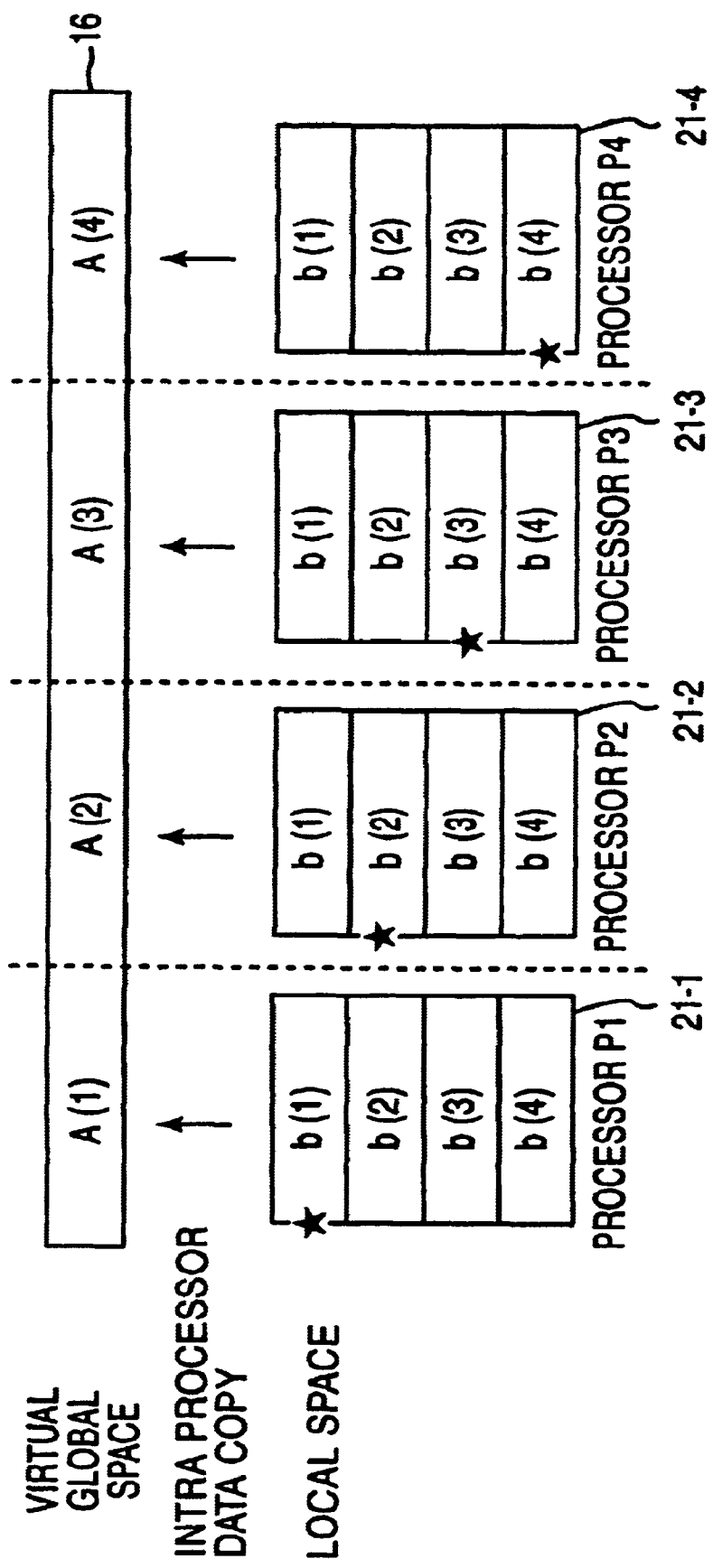
FIG. 13 shows a fourth embodiment of the present invention.

FIG. 13 is a diagram illustrating a fourth embodiment of the present invention, in which a processor which has a global variable A(I) in its memory performs a writing process specified by the program of FIG. 11.

In FIG. 13, the storing locations of the global variables A(I) and the local variables b(I) and their values are the same as those in FIG. 12.

When the load module of the program of FIG. 11 is executed in parallel by the processors P1 to P4, each processor makes a determination of whether or not the global variable A(I) to be written into is stored in its memory. When the variable is stored, it performs the writing process. In the case of FIG. 13, the processor P1 which stores the global variable A(1) copies the value of the local variable b(1) into the area of A(1). The processor P2 which stores the global variable A(2) copies the value of the local variable b(2) into the area of A(2). The processor P3 which stores the global variable A(3) copies the value of the local variable b(3) into the area of A(3). The processor P4 which stores the global variable A(4) copies the value of the local variable b(4) into the area of A(4). Thus, among the local variables present in the local spaces 21-1 to 21-4 of FIG. 13, the local variables b(I) with asterisks are written into the corresponding global variables A(I) respectively.

Unlike the third embodiment of FIG. 12, the fourth embodiment of FIG. 13 eliminates the need for processor-to-processor data transfers, thus permitting faster processing.

Hereinafter, reference will be made to FIGS. 14 and 15 to describe the redundant processing of those libraries in the third and fourth embodiments which perform a process of writing into a global variable spanning a plurality of processors. Like the libraries in the first and second embodiments, these libraries are implemented by the CPUs of the respective processors and have functions of the right-of-write determination processing section and the write processing section.

Figure 14:
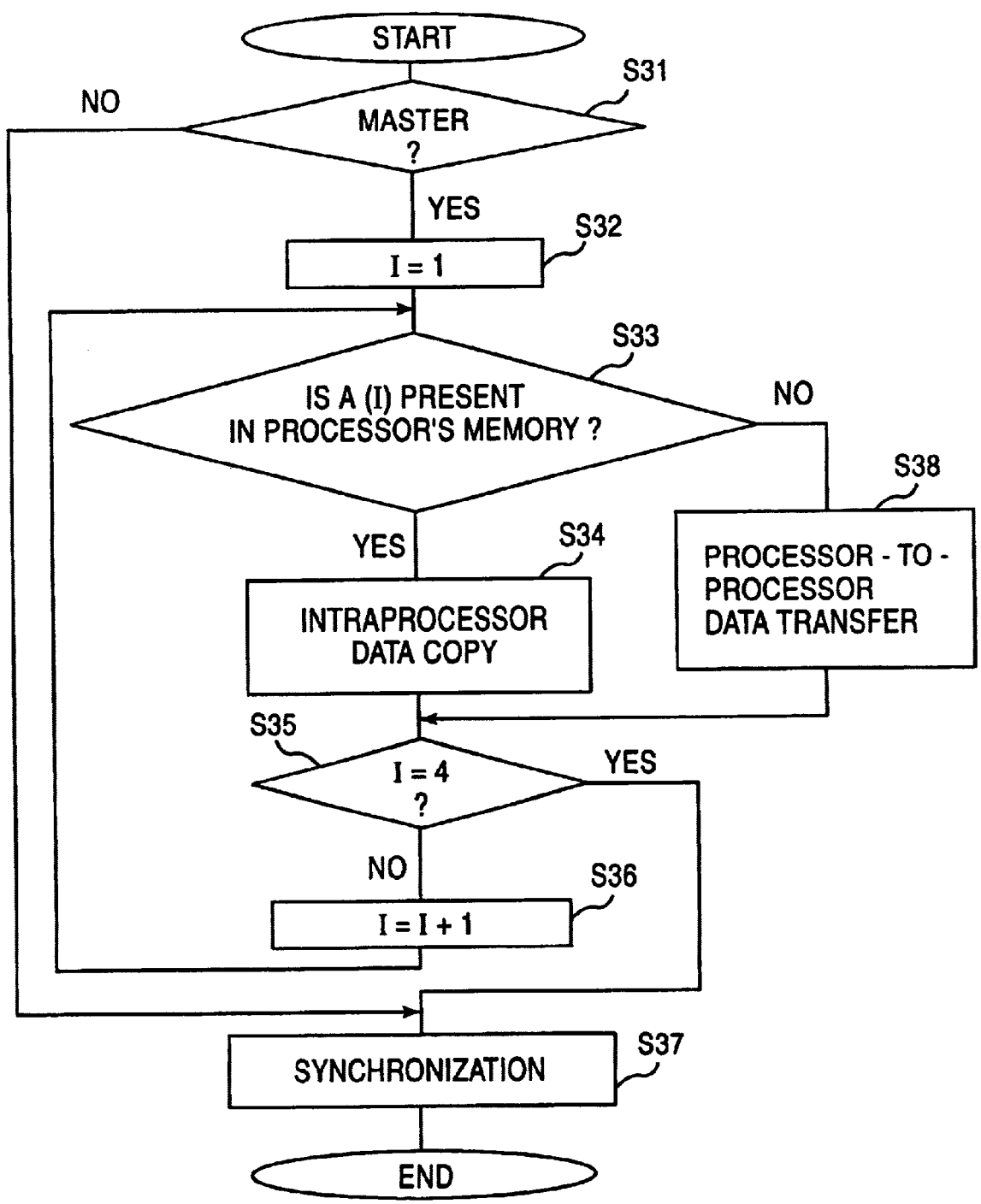
FIG. 14 is a flowchart for redundant processing of the third embodiment of the present invention.

FIG. 14 is a flowchart for the redundant processing and the synchronization processing of the third embodiment.

When the redundant processing of the library is started, each processor implementing the library first makes a determination in step S31 of whether or not it is the master processor. If it is not the master processor, it performs the synchronization processing in step S37 as in FIG. 8 without performing a writing process.

If, on the other hand, it is the master processor, then it sets I to 1 in step S32 and then makes a determination in step S33 of whether or not the global variable A(I) to be written into is present within its memory. If it is not, then that processor writes the value of b(I) within its local space into a memory area of some other processor in which the global variable A(I) is present through processor-to-processor data transfer over the communications network 10 and then the process advances to step S35. If it is in step S33, then the processor copies the value of b(I) within its local space into a memory area of A(I) within the virtual global space 16 and then the process advances to step S35.

In step S35, a determination is made as to whether or not I equals 4. If it does not, then the value of I is incremented in step S36. The process subsequently returns to step S33 again. Steps S33, S34, S35, S36, and S38 are repeated until I becomes equal to 4. If, in step S35, the determination is that I equals 4, then the synchronization processing is performed in step S37. Thus, the process comes to an end.

Figure 15:
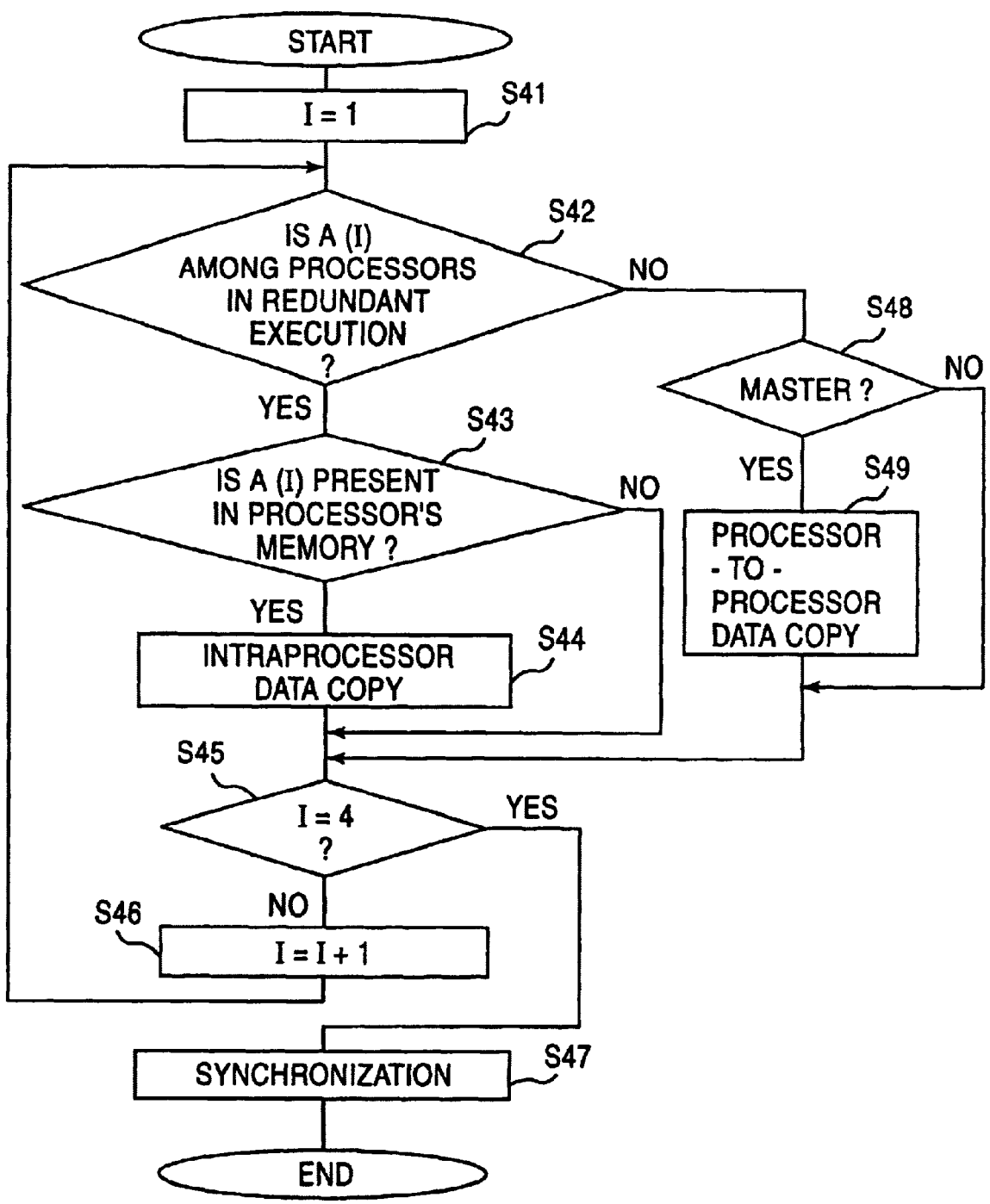
FIG. 15 is a flowchart for redundant processing of the fourth embodiment of the present invention.

FIG. 15 is a flowchart for the redundant processing and the synchronization processing of the fourth embodiment.

When the redundant processing of the library is started, I is first set to I equals 1 in step S41. In subsequent step S42, a determination is made as to whether or not the global variable A(I) to be written into is present in the processors that are performing the redundant processing.

If it is in step S42, then each processor makes a determination in step S43 of whether or not the global variable A(I) is present within its memory. If it is not, then the process advances to step S45 without performing any writing process. If it is in step S43, on the other hand, then the processor copies the value of b(I) within its local space into a memory area of A(I) within the virtual global space 16 in step S44 and subsequently the process advances to step S45.

If, in step S42, the global variable A(I) is not present in the processors performing the redundant processing, then each processor executing the library makes a determination in step S48 of whether it is the master processor or not. If it is not, the process advances to step S45 without performing any writing process. If, on the other hand, it is in step S48, then that processor writes the value of b(I) within its local space into the memory area of some other processor in which the global variable is present through processor-to-processor data transfer over the communications network 10 in step S49 and subsequently the process advances to step S45.

In step S45, a determination is made as to whether or not I equals 4. If it does not, then the value of I is incremented in step S46 and the process returns to step S42. Steps S42, S43, S44, S45, S46, S48, and S49 are repeated until I becomes equals to 4. If, in step S45, the determination is that I equals to 4, then the process advances to step S47. In step S47, the same synchronization processing as in FIG. 8 is performed. Thus, the process comes to an end.

In the case of the processing of FIG. 15, when the global variable A(I) to be written into is present in the processors that are in redundant execution, the program of FIG. 11 can be executed through intraprocessor data copy without performing processor-to-processor data transfers.

In the case of the processing of FIGS. 14 and 15, the redundant processing comes to an end when I becomes equal to 4. However, selecting this condition arbitrarily would permit the present invention to be applied to arrays having greater dimensions.

According to the present invention, as described above, the number of times of processor-to-processor data transfers requiring an appreciable amount of execution time for redundant processing can be reduced, thus substantially reducing the time required to execute the redundant execution. When the location to which data is transferred is in processors in redundant execution processor-to-processor data transfers need not be performed in the second and fourth embodiments in particular. Thus, transfer collisions between processors, which may occur when the amount of data to be transferred increases, become difficult to occur improving the system's processing capability.

What is claimed is:

1. A distributed-memory multiprocessor system, including a plurality of individual processors, wherein each individual processor of said plurality of individual processors includes a memory, and wherein each individual processor is interconnected to other individual processors by a communications line, and wherein the memories of each of the individual processors include a private storage space and a shared storage space, access areas being distributed to shared storage spaces of the plurality of individual processors, said shared storage spaces being configured to form a virtual storage space, said plurality of individual processors being configured to perform parallel processing while accessing said virtual storage space, an individual processor of said plurality of processors comprising:

a right-of-access determination unit making a determination of whether or not the individual processor is to make access to the virtual storage space, said right-of-access determination unit being configured to make said determination when two or more processors of said plurality of processors are in redundant execution of access to said virtual storage space; and an access unit, coupled to said right-of-access determination unit, making access to said virtual storage space when receiving from said right-of-access determination unit a result of the determination that the individual processor is to make access to the virtual storage space, wherein said right-of-access determination unit determines that the individual processor is to make access to the virtual storage space, and wherein a right-of-access determination unit of another individual processor of said plurality of processors determines that the another processor is not to make access.

2. A distributed-memory multiprocessor system, including a plurality of individual processors, wherein each individual processor of said plurality of individual processors includes a memory, and wherein said each individual processor is interconnected to other individual processors of said plurality of individual processors by a communications line, and wherein the memories of each of the individual processors include a private storage space and a shared storage space, access areas being distributed to shared storage spaces of the plurality of individual processors, said shared storage spaces being configured to form a virtual storage space, said plurality of individual processors being configured to perform parallel processing while making access to the virtual storage space, an individual processor of said plurality of processors comprising:

a right-of-write determination unit making a determination of whether or not said individual processor is to write into the virtual storage space; and a writing unit, coupled to said right-of-write determination unit, writing the data into said virtual storage space when receiving from said right-of-access determination unit a result of the determination that said individual processor is to write into the virtual storage space, wherein said writing unit prevents writing of the data into said virtual storage space when receiving from said right-of-write determination unit a result of the determination that said individual processor is not to perform the writing into the virtual storage space, wherein said right-of-write determination unit determines that the individual processor is to perform the writing, and a right-of-write determination unit of another processor of said plurality of processors determines that said another processor is not to perform the writing.

3. A distributed-memory multiprocessor system, including a plurality of individual processors, wherein each individual processor of said plurality of individual processors includes a memory, and wherein said each individual processor is interconnected to other individual processors of said plurality of individual processors by a communications line, and wherein the memories of each of the individual processors include a private storage space and a shared storage space, access areas being distributed to shared storage spaces of the plurality of individual processors, said shared storage spaces being configured to form a virtual storage space, said plurality of individual processors being configured to perform parallel processing while making access to the virtual storage space, an individual processor of said plurality of processors comprising:

a right-of-write determination unit making a determination of whether or not said individual processor is to write into the virtual storage space; and a writing unit, coupled to said right-of-write determination unit, writing the data into said virtual storage space when receiving from said right-of-access determination unit a result of the determination that said individual processor is to write into the virtual storage space, wherein said right-of-write determination unit includes a representative determination unit making a representative determination of whether said individual processor is a representative of two or more processors in redundant execution.

4. The distributed-memory multiprocessor system according to claim 3, wherein said writing unit prevents writing of the data into the virtual storage space when receiving from said representative determination unit a result of the determination that said individual processor is not the representative of two or more processors in redundant execution.

5. The distributed-memory multiprocessor system according to claim 4, wherein said representative determination unit of said individual processor determines that said individual processor is the representative, and a representative determination unit of another processor of the two or more processors determines that said another processor is not the representative.

6. A distributed-memory multiprocessor system, including a plurality of individual processors, wherein each individual processor of said plurality of individual processors includes a memory, and wherein said each individual processor is interconnected to other individual processors of said plurality of individual processors by a communications line, and wherein the memories of each of the individual processors include a private storage space and a shared storage space, access areas being distributed to shared storage spaces of the plurality of individual processors, said shared storage spaces being configured to form a virtual storage space, said plurality of individual processors being configured to perform parallel processing while making access to the virtual storage space, an individual processor of said plurality of processors comprising:

a right-of-write determination unit making a determination of whether or not said individual processor is to write into the virtual storage space; and a writing unit, coupled to said right-of-write determination unit, writing the data into said virtual storage space when receiving from said right-of-access determination unit a result of the determination that said individual processor is to write into the virtual storage space, wherein said right-of-write determination unit of said individual processor includes a location determination unit making a location determination of whether an area into which said data is written is located within the memory of said individual processor, and wherein said writing unit of said individual processor writes said data into said area when receiving from said location determination unit a result of the determination that said area is located within the memory of said individual processor.

7. The distributed-memory multiprocessor system according to claim 6, wherein said writing unit prevents writing of the data into said virtual storage space when receiving from said location determination unit a result of the determination that the virtual storage space is not located within the memory of said individual processor.

8. A distributed-memory multiprocessor system, including a plurality of individual processors, wherein each individual processor of said plurality of individual processors includes a memory, and wherein said each individual processor is interconnected to other individual processors of said plurality of individual processors by a communications line, and wherein the memories of each of the individual processors include a private storage space and a shared storage space, access areas being distributed to shared storage spaces of the plurality of individual processors, said shared storage spaces being configured to form a virtual storage space, said plurality of individual processors being configured to perform parallel processing while making access to the virtual storage space, an individual processor of said plurality of processors comprising:

a right-of-write determination unit making a determination of whether or not said individual processor is to write into the virtual storage space; and a writing unit, coupled to said right-of-write determination unit, writing the data into said virtual storage space when receiving from said right-of-access determination unit a result of the determination that said individual processor is to write into the virtual storage space, wherein said individual processor includes the data in the memory thereof, and wherein said right-of-write determination unit includes a representative determination unit making a representative determination of whether or not said individual processor is a representative of two or more of processors in redundant execution, said right-of-write determination unit also including a location determination unit making a location determination of whether an area into which the data is written is located within the memory of said individual processor, and wherein said writing unit copies the data into said area when receiving from said representative determination unit a result of the determination that said individual processor is the representative, and from said location determination unit a result of the determination that said area is located within the memory of said individual processor, and wherein said writing unit transfers the data over said communications line to another individual processor of said two or more processors in redundant execution, in which said area is located, when receiving from the representative determination unit a result of the determination that said individual processor is the representative, and from the location determination unit a result of the determination that said area is not located within the memory of said individual processor, and wherein said writing unit prevents writing of the data into said area when receiving from said representative determination unit a result of the determination that said individual processor is not the representative.

9. The distributed-memory multiprocessor system according to claim 8, wherein said area into which the data is written consists of a plurality of sections distributed to a plurality of memories corresponding to said virtual storage space, and wherein said writing unit writes the data into a section of said area located within the memory of the individual processor and transfers the data to a section of said area located within the memory of at least one other individual processor of said two or more processors in redundant execution over said communications line when writing the data into said area.

10. The distributed-memory multiprocessor system according to claim 8, wherein after said right-of-write determination unit and said writing unit perform a right-of-write determination and a writing respectively, synchronization is performed among said two or more processors to terminate the redundant execution.

11. A distributed-memory multiprocessor system, including a plurality of individual processors, wherein each individual processor of said plurality of individual processors includes a memory, and wherein said each individual processor is interconnected to other individual processors of said plurality of individual processors by a communications line, and wherein the memories of each of the individual processors include a private storage space and a shared storage space, access areas being distributed to shared storage spaces of the plurality of individual processors, said shared storage spaces being configured to form a virtual storage space, said plurality of individual processors being configured to perform parallel processing while making access to the virtual storage space, an individual processor of said plurality of processors comprising:

a right-of-write determination unit making a determination of whether or not said individual processor is to write into the virtual storage space; and a writing unit, coupled to said right-of-write determination unit, writing the data into said virtual storage space when receiving from said right-of-access determination unit a result of the determination that said individual processor is to write into the virtual storage space, wherein said individual processor includes the data in the memory thereof, and wherein said right-of-write determination unit includes a representative determination unit making a representative determination of whether or not said individual processor is a representative of the two or more processors in redundant execution, said right-of-write determination unit also including a location determination unit making a location determination of whether or not an area into which the data is written is located within memories of the two or more processors in redundant execution, and wherein said writing unit copies the data into said area when receiving from said location determination unit a result of the determination that said area is located within the memories of the two or more processors in redundant execution and that said area is located within the memory of said individual processor, and wherein said writing unit prevents writing of the data into said area when receiving from said location determination unit a result of the determination that said area is located within the memories of the two or more processors but not within the memory of said individual processor, and wherein said writing unit transfers the data over said communications line to another individual processor of said two or more processors, in which said area is located, when receiving from said representative determination unit a result of the determination that said individual processor is the representative and from said location determination unit that said area is not located within the memories of the two or more processors, and wherein said writing unit prevents writing of said data into said area when receiving from said location determination unit a result of the determination that said area is not located within the memories of the two or more processors and from said representative determination unit a result of the determination that said individual processor is not the representative.

12. The distributed-memory multiprocessor system according to claim 11, wherein said area into which the data is written consists of a plurality of sections distributed to a plurality of memories corresponding to said virtual storage space, and wherein said writing unit writes the data into a section of said area located within the memory of said individual processor and transfers the data to a section of said area located within the memory of at least one other individual processor of said two or more processors over said communications line when writing the data into said area.

13. The distributed-memory multiprocessor system according to claim 11, wherein after right-of-write determination of said right-of-write determination unit and writing of said writing unit is completed, synchronization is performed among said two or more processors to terminate the redundant execution.

14. A distributed-memory multiprocessor system having a plurality of individual processors, wherein each individual processor of said plurality of individual processors includes a memory, and wherein the memory of each of said individual processors is associated with a virtual storage space, wherein each individual processor is configured to access said virtual storage space, and wherein at least two individual processors of said plurality of individual processors are configured to write into said virtual storage space during a redundant execution, and wherein said at least two individual processors perform identical processes during the redundant execution, said distributed-memory multiprocessor system comprising:
- a representative determination unit making a determination of whether or not an individual processor of said at least two individual processors is representative of said at least two individual processors in redundant execution; and
- a writing processing unit, responsive to said representative determination unit, causing said individual processor to write into said virtual storage space at the redundant execution when the representative determination unit determines that the individual processor is the representative, said writing processing unit preventing other processors of said at least two individual processors from writing.

15. A distributed-memory multiprocessor system having a plurality of individual processors, wherein each individual processor of said plurality of individual processors includes a memory, and wherein the memory of each of said individual processors is associated with a virtual storage space, wherein each individual processor is configured to access said virtual storage space, and wherein at least two individual processors of said plurality of individual processors are configured to write into said virtual storage space during a redundant execution, and wherein said at least two individual processors perform identical processes during the redundant execution, each individual processor of said at least two individual processors comprising:
- a variable location determination unit making a determination of whether a variable location to be written into is located within the memories of the at least two individual processors in redundant execution, and whether the variable location is within a memory of an individual processor of said at least two individual processors in redundant execution; and
- a writing processing unit responsive to said variable location determination unit, causing said individual processor to write into said virtual storage space at redundant execution when said variable location determination unit determines that said variable location is within the memory of said individual processor, said writing processing unit preventing other processors of said at least two individual processors from writing.

16. A distributed-memory processing method performed by a plurality of individual processors, each individual processor of said plurality of individual processors including a memory, each of said plurality of individual processors being interconnected by a communications line, memories of each individual processor of said plurality of individual processors being associated with a virtual storage space, said plurality of individual processors performing parallel processing while accessing said virtual storage space, said method comprising:
- determining whether an individual processor of said plurality of individual processors is to write data into said virtual storage space in a process performed by said individual processor, said determination being made when two or more individual processors of said plurality of individual processors are in redundant execution;
- writing said data into said virtual storage space when said individual processor is determined to write;
- determining whether or not said individual processor is a representative of the two or more individual processors in redundant execution;
- determining whether or not an area into which said data is written is present within the memory of said individual processor;
- performing one operation, said one operation being one of copying said data into said area when said individual processor is the representative and said area is present within the memory of said individual processor, transferring said data over said communications line to another individual processor of said plurality of individual processors in which said area is present when said individual processor is the representative and said area is not located within the memory of said individual processor; and
- preventing said individual processor from writing said data into said area when said individual processor is not the representative.

17. A distributed-memory processing method performed by a plurality of individual processors, each individual processor of said plurality of individual processors including a memory, each of said plurality of individual processors being interconnected by a communications line, memories of each individual processor of said plurality of individual processors being associated with a virtual storage space, said plurality of individual processors performing parallel processing while accessing said virtual storage space, said method comprising:

determining whether an individual processor of said plurality of individual processors is to write data into said virtual storage space in a process performed by said individual processor, said determination being made when two or more individual processors of said plurality of individual processors are in redundant execution;

writing said data into said virtual storage space when said individual processor is determined to write;

determining whether or not said individual processor is a representative of the two or more individual processors in redundant execution;

determining whether or not an area into which said data is written is present within the memories of the two or more individual processors in redundant execution;

determining whether or not said area is present in the memory of said individual processor;

copying said data into said area when said area is present within the memories of the two or more individual processors in redundant execution and said area is present within the memory of said individual processor;

preventing said individual processor from writing said data into said area when said area is present within the memories of the two or more individual processors in redundant execution but not present within the memory of said individual processor;

transferring said data over said communications line to another individual processor of said plurality of individual processors in which said area is present when said area is not present within the memories of the two or more individual processors in redundant execution and said individual processor is the representative; and preventing said individual processor from writing said data into said area when said area is not present within the memories of the two or more individual processors in redundant execution and said individual processor is not the representative.

* * * * *